2,907,253
SINGLE FILM CAMERA PROVIDED WITH A PLURALITY OF SEPARATE LENSES

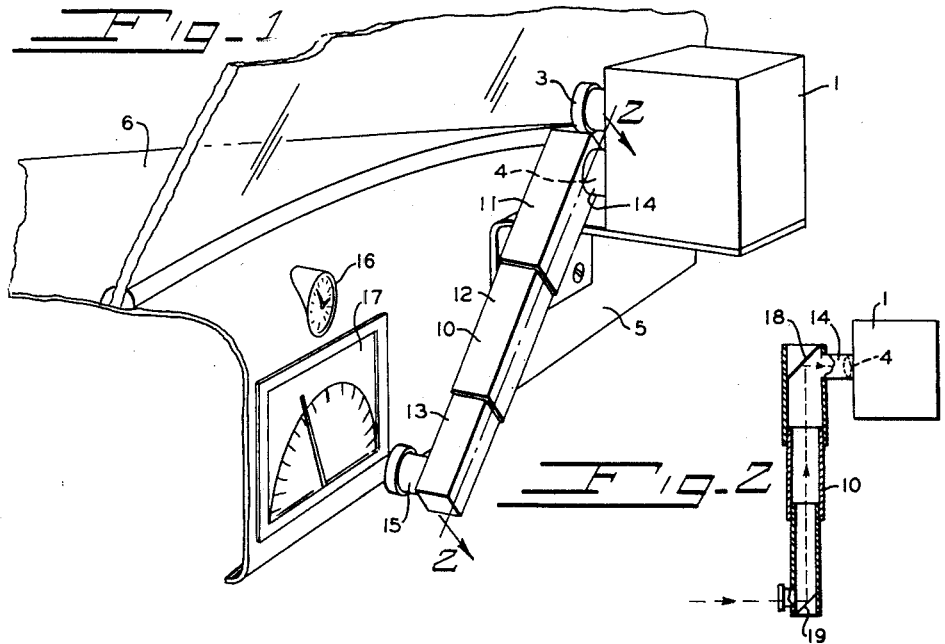
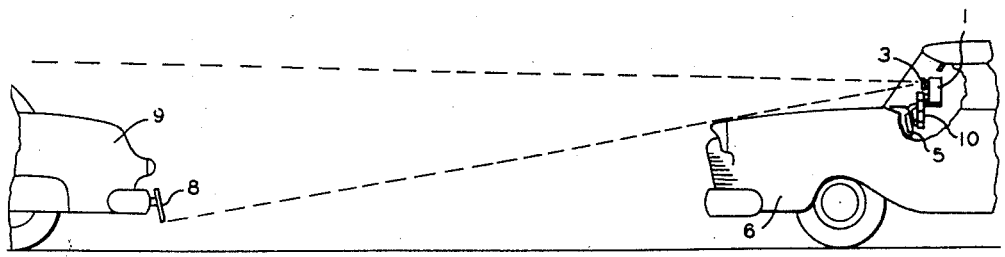
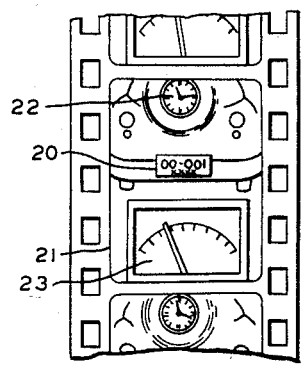
INVENTOR.
DONALD MC DONALD
BY
DES JARDINS & ROBINSON
HIS ATTORNEYS

Donald McDonald, Louisville, Ky.

Application November 7, 1956, Serial No. 620,857

1 Claim. (Cl. 95—1.1)

This invention relates to a single film camera provided with a plurality of separate lenses for simultaneously photographing on the single film scenes in different directions, and it particularly pertains to means for bringing into view in front of one lens of the camera a scene or scenes from one or more different directions to be simultaneously photographed on the same film with a scene that is photographed through the lens in front of the camera.

Cameras have heretofore been devised for taking views of different indicators of a motor vehicle and a scene in front of said vehicle, but these have been of very involved and complex construction.

Accordingly, one of the main objects of this invention is a camera which is simple in construction and efficient in operation for photographing multiple scenes as a single scene on the single film.

Another object of the invention is a camera which can be conveniently mounted on a vehicle for taking a view ahead and is provided with means for bringing into view one or more instrument indicators to be recorded.

Another object of the invention is a camera in which two or more views from different directions are taken on a single film simultaneously.

Further objects, and objects relating to details of construction and economies of operation, will readily appear from the detailed description to follow. In one instance, the objects of the invention have been accomplished by the device and means set forth in the following specification. The invention is clearly defined and pointed out in the appended claim. A structure constituting a preferred embodiment of the invention is illustrated in the accompanying drawings, forming a part of this specification, in which:

Fig. 1 is a view of a portion of dash panel of a motor vehicle equipped with one embodiment of my invention.

Fig. 2 is a cross section on line 2—2 of Fig. 1, looking in the direction of the arrows.

Fig. 3 is a diagrammatic view, showing a motor vehicle equipped with one embodiment of my invention and the rear end of a motor vehicle being followed.

Fig. 4 is a view of a portion of a film with the two scenes photographed thereon.

Referring specifically to the drawings, in which like numerals designate like parts, numeral 1 is a conventional camera provided with two lenses 3 and 4 disposed adjacent the single film in the camera.

The camera is mounted above the dash panel 5 of a motor vehicle 6 in convenient position for a view ahead to be taken through lens 3, and particularly of the rear license plate 8 of a motor vehicle 9 being followed by the motor vehicle 6 on which the camera is mounted. The camera is especially useful for police cars in obtaining evidence as to the speed of other vehicles being followed and filmed.

Associated with lens 4 is a tube 10 comprised of telescoping sections 11, 12 and 13 connected together for being adjusted to desired length. Section 11 is connected at one end to a tubular section 14 which is swiveled about lens 4 of the camera, and the end of section 13 is connected to a tubular section 15 disposed in front of a clock 16 and speedometer dial 17 of the motor vehicle, the clock and speedometer dial being sufficiently close for both to be in view through the tube 10. This tube 10 is a periscope for bringing into view in front of the lens 4 the clock and speedometer dials so that they can be photographed at the same time that the photograph is taken of the scene ahead through the other lens 3. This tube 10 or periscope is conventional having one deflecting lens 18 in the end of section 11 and another deflecting lens 19 in the end of section 13, said lenses being disposed adjacent the respective tube sections 14 and 15. The periscope is adjustable so as to be fitted for the clock and speedometer dials to be always in the range of the camera lens 4. Accordingly, when camera lens 3 is focused on the rear license plate 8 of a motor vehicle 9 being followed by the motor vehicle 6, it can be photographed at 20 on the single film 21 with the photographic view 22 and 23 of the clock and speedometer dials taken through lens 4 of the camera.

The distance between the following vehicle and the vehicle being followed can be definitely determined by the size of the image of the license plate. Hence, with two or more photographs taken at intervals, the speed of the followed vehicle can be readily determined as its license plate will be shown on the same film with the time and speed of the following vehicle being given. If for example, the following vehicle is shown by the photograph to be running at the rate of 75 miles an hour behind the followed vehicle at a certain time at a certain distance therefrom, and, within a second later, is still shown to be traveling at that same speed and at the same distance behind the vehicle being followed, the photograph will show that the followed vehicle was traveling at the same rate of speed.

While in the embodiment of the drawings, one extra lens is shown on the camera with a periscope adapted thereto, it will, of course, be understood that there could be more than one extra lens provided in the camera with a periscope attached to each.

Where the clock and speedometer indicator are combined as a unit, or are separate units placed near enough to be focused together as one view or image, one periscope attachment is sufficient. However, where they are separate and not near enough together to be focused through one periscope to the camera lens to which the periscope is fitted, there may be more than one extra lens on the camera with a separate periscope for each.

It is also within the scope of this invention to have the clock built into the periscope or mounted thereon in position for it to be focused on the extra lens of the camera so that it would be photographed with any other view or scene on which the periscope was focused.

While the invention has been illustrated and described for use with a motor vehicle for taking on a single film the instrument indicators of one vehicle and the rear of another vehicle being followed, it will be understood that the invention is not thereby limited. It may be used for any purpose where two or more scenes from different directions are to be taken as one image on the single film.

I am aware that there may be various changes in details of construction without departing from the spirit of my invention, and, therefore, I claim my invention broadly as indicated by the appended claim.

Having thus described my invention, what I claim as new and useful and desire to secure by United States Letters Patent, is:

In combination with a motor vehicle, a camera detachably mounted in said motor vehicle in position to record moving objects ahead of said vehicle, said camera provided with a first lens for a single film to record said moving objects and a second lens for recording instruments on the panel of said motor vehicle, and a longitudinally extensible periscope pivotally connected to the camera for one end thereof to be associated with said second lens for recording said panel instruments on said film and its opposite distal end to be moved to reflect the images of said panel instruments through said second lens.

References Cited in the file of this patent

UNITED STATES PATENTS

| | | |
|---|---|---|
| 2,210,610 | White | Aug. 6, 1940 |
| 2,250,442 | Abell | July 29, 1941 |
| 2,336,081 | Finnegan | Dec. 7, 1943 |